United States Patent
Ball

Patent Number: 5,113,910
Date of Patent: May 19, 1992

[54] BUTTERFLY VALVE WITH BIASED AREA REDUCTION MEANS

[75] Inventor: Larry K. Ball, Chandler, Ariz.

[73] Assignee: Allied-Signal Inc., Morris Township, Morris County, N.J.

[21] Appl. No.: 778,429

[22] Filed: Oct. 16, 1991

Related U.S. Application Data

[63] Continuation-in-part of Ser. No. 374,897, Jun. 30, 1989.

[51] Int. Cl.$^5$ ................................................ F16K 1/22
[52] U.S. Cl. ............................. 137/630.15; 137/599.2; 251/283; 251/305
[58] Field of Search .................. 137/630.15, 599.2; 251/283, 305

[56] References Cited

U.S. PATENT DOCUMENTS

| | | |
|---|---|---|
| 2,796,082 | 6/1957 | Green et al. |
| 3,147,768 | 9/1964 | Kennedy |
| 3,971,414 | 7/1976 | Illing |
| 4,962,783 | 10/1990 | Ball et al. |
| 4,964,431 | 10/1990 | Ball et al. |
| 4,969,485 | 11/1990 | Ball et al. |
| 4,995,414 | 2/1991 | Tervo |

FOREIGN PATENT DOCUMENTS 1178171  7/1957  Fed. Rep. of Germany .

Primary Examiner—Robert G. Nilson
Attorney, Agent, or Firm—Joseph R. Black; James W. McFarland; Robert A. Walsh

[57] ABSTRACT

A butterfly valve adapted for controlled variation in the area of the leading wing of the valve plate. The valve plate is comprised of two parallel plate-like members which are relatively translatable in mutually parallel directions. The relative translational movement further covers or uncovers an open area formed through one of the two members on the leading wing thereof. Movement of the valve plate occurs as either rotational movement of the entire valve plate or relative translational movement between the foresaid members. The type of movement depends on whether the force exerted on the members by a biasing mechanism is exceeded by the torque exerted on the valve plate by a conveyed fluid.

1 Claim, 2 Drawing Sheets

ANGLE OF ROTATION

BUTTERFLY VALVE WITH BIASED AREA REDUCTION MEANS

This application is a continuation-in-part of application Ser. No. 374,897 entitled Butterfly Valves With Actuators Carried On Valve Plate, which was filed on Jun. 30, 1989.

TECHNICAL FIELD

The present invention relates generally to butterfly valves and more specifically to those which achieve a reduction in torque by reducing the effective area of the valve plate.

BACKGROUND OF THE INVENTION

There are numerous examples in the prior art of reducing the torque exerted by a conveyed fluid on the valve plate of a butterfly valve, where the torque reduction results from a reduction in the effective area of the valve plate.

In some cases, as illustrated by U.S. Pat. No. 2,796,082 Green, the area reduction is provided in the form of a pilot valve used to facilitate initial opening of the valve plate. This does not significantly reduce torque over a broad range of rotational positions of the valve plate.

In other cases, as illustrated by U.S. Pat. No. 3,971,414 Illing, a reduction in the effective area of the valve plate is used to effect a significant overall reduction in the torque applied to the valve plate by the conveyed fluid. However, structures such as that disclosed by Illing present difficulty in applications which demand sealing at the closed rotational position of the valve plate. More importantly, the reduction in effective area, as a function of the rotational position of the valve plate, is fixed by the design of the valve structure described by Illing. This limits the effectiveness of the valve in applications characterized by variable pressure ratios, since the optimal functional relationship depends on the pressure ratio (upstream/downstream) of the conveyed fluid.

SUMMARY OF THE INVENTION

The invention is a butterfly valve that is structurally adapted to reduce the effective area of the leading wing of the valve plate while maintaining the effective area of the trailing wing, wherein a reduction or further reduction in area occurs in response to attempted rotational movement of the plate accompanied by a sufficiently high resistance to such rotational movement.

The area reduction is accommodated by forming the valve plate from two parallel plate-like members which are translationally movable relative to each other in directions parallel to the members, wherein one of the members is employed to cover or variably open a hole formed through the other.

A biasing mechanism is secured to one of the plate-like members and is operatively associated with the second so as to resist translational movement thereof. However, the translational movement is permitted in response to a condition in which resistance to rotational movement of the valve plate exceeds resistance to translational movement of the second plate-like member.

The biasing resistance may be selected to nominally exceed that resistance to rotational movement of the valve plate which results from sealing engagement of the latter with the interior wall of the flow body in which the plate is mounted.

DESCRIPTION OF THE PREFERRED EMBODIMENT

Figure 1:
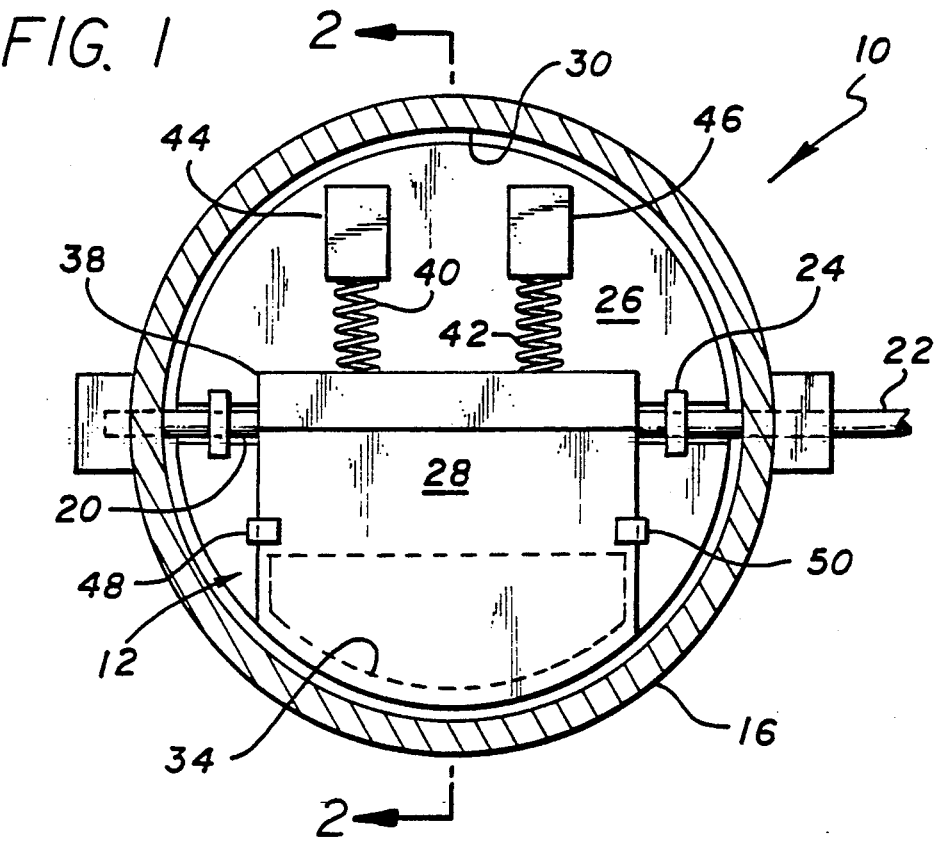
FIG. 1 is a partially cross-sectional and partially elevational view of a butterfly valve in accord with the invention, and is taken along line 1—1 of FIG. 2.
Figure 2:
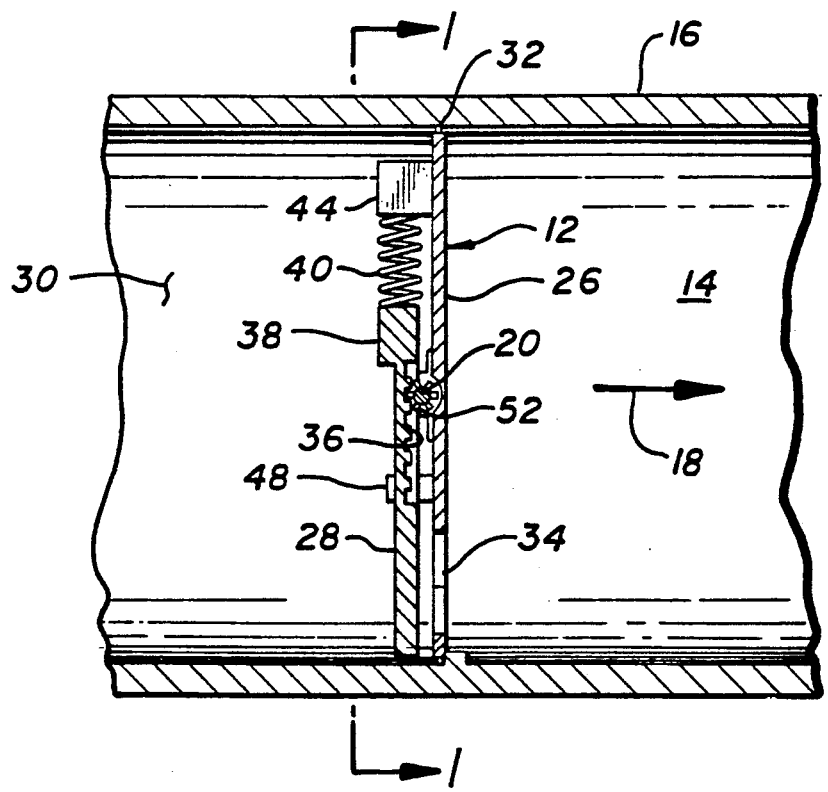
FIG. 2 is a cross-sectional view taken along line 2—2 of FIG. 1.

FIGS. 1 and 2 of the drawings illustrate a butterfly valve 10 in which the valve plate 12 is at a rotational position closing fluid communication along a flow path 14. The flow path 14 is formed by a mounting body or flow body 16 to which the valve plate 12 is secured by conventional means for rotational movement in the path. As viewed in FIG. 2, flow proceeds in a direction from left to right, thus defining a longitudinal direction 18 of extension of the flow path 14.

A shaft 20 is journalled in the mounting body 16 and extends across the flow path 14. A distal end 22 of the shaft 20 extends outwardly from the mounting body 16 to receive torque applied in use by an external actuator (not shown). The valve plate 12 is secured to the shaft 20 by two brackets (as at 24) which partially envelop the shaft, are rigidly secured to the plate, and permit relative rotational movement therebetween. The longitudinal axis of the shaft 16 geometrically divides the valve plate 12 into a leading wing 23, and a trailing wing 25 with respect to the direction of flow.

The valve plate 12 is comprised of first and second plate-like members 26,28. The first member 26 is generally peripherally conformal to the interior surface 30 of the mounting body 16. Thus, in the illustrated embodiment as viewed in FIG. 1, the first member 26 is circular in shape. The circumferential periphery of the first member 26 is surrounded by an annular seal 32 which is seated in a recess (not shown) formed in the first member. At the rotational position indicated in FIG. 2, the valve plate 12 is in sealing engagement with the interior surface 30 via the seal 32. The first member 26 has a hole 34 formed through the leading wing thereof. The shape of the hole 34 is unimportant except as it relates to the shape of the second member 28. However, the benefit provided by the invention is greatest if the area defined by the hole 34 is maximized. The maximum area, however, is limited by the desire to avoid projection of the second member 28 in a radially outward direction from the first member 26. The second member 28 is formed to provide a rack gear 36. The rack gear 36 engages two axially-spaced pinion gears (as at 38) rigidly secured to the shaft 16. The second member 28 has a thicker portion 38 into which two bores (not shown) are formed to receive the indicated ends of two helical springs 40,42. The opposite ends of the springs are received in opposing bores (not shown) formed in two spaced bodies 44,46 which are rigidly secured to the first member 26. The ends of the springs 40,42 abut the bottom surfaces (not shown) formed by the respective bores, and are slightly compressed when the valve plate 12 is at the rotational position indicated in FIG. 2. Two L-shaped guides 48,50 are rigidly secured to the first member 26 and serve to retain the second member 28 as well as guide translational movement thereof.

Rigidly secured to the shaft 20 are two spaced pinion gears (as at 52) that are in engagement with the rack gear 36. The rack and pinion gears 36,52 serve to convert rotational movement of the shaft 20 relative to the first member 26, to translational movement of the second member 28 relative to the first. As one alternative to the illustrated rack and pinion arrangement, the second member 28 can be modified for securement of a link mechanism to the second member and the shaft 20, so that conversion occurs in a manner similar to that disclosed in U.S. Pat. No. 5,046,527 Tervo.

Figure 3:
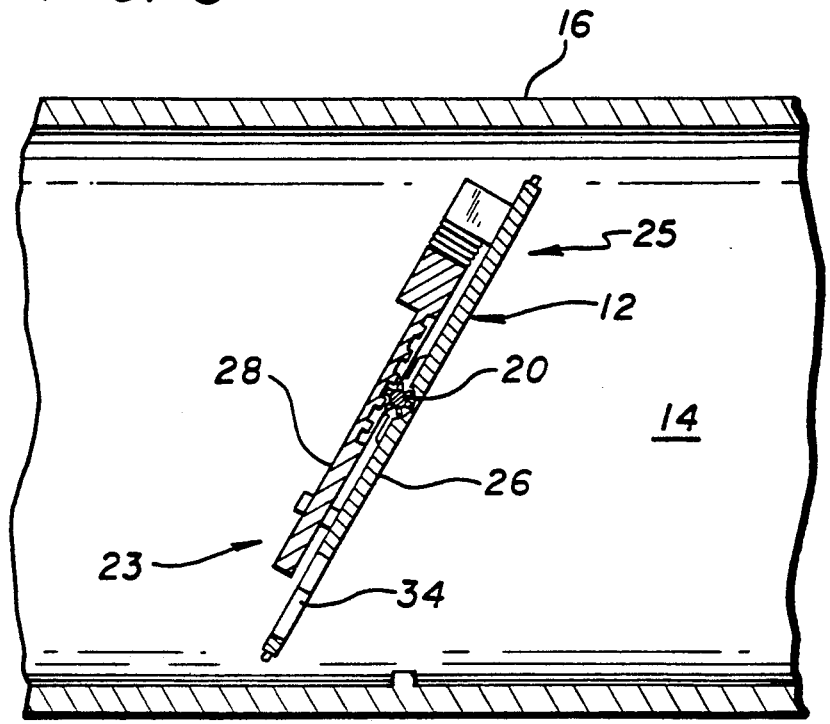
FIG. 3 is a cross-sectional view as in FIG. 2, illustrating the valve in an open position.

Operation of the valve 10 can now be described with reference to FIGS. 2 and 3. At the rotational position indicated in FIG. 2, the valve plate 12 closes fluid communication along the path 14, and a certain amount of rotational torque is required to overcome the frictional force associated with movement of seal 32 relative to the interior surface 30. Accordingly, the springs 40, 42 are selected to ensure that they collectively prevent translational movement of the second member 28 when that amount of torque is applied to the shaft 20 in a clockwise direction, as viewed in FIG. 2. At the same rotational position of the valve plate 12, the second member 28 spans the hole 34 as indicated to maximally obstruct leakage therethrough. To further obstruct or prevent such leakage, the valve plate 12 may incorporate a seal surrounding the hole 34 and seated in the first member 26, with the guides 48,50 being used to hold the second member 28 against the seal with minimal force.

As the valve plate 12 is rotated to an open position, the forementioned frictional force is minimized by disengagement of the seal 32 with the interior surface 30 along most of the circumferential extension of the former. Preferably, this effect is maximized by use of the known expedient of providing a slight offset geometry between the shaft 20 and the valve plate 12.

At some open rotational position of the valve plate 12, the biasing force exerted by the springs 40,42 on the second member 28 is overcome by the net torque exerted on the valve plate 12 by the fluid conveyed through the mounting body 16. At that position (which depends on the pressure drop across the plate, and on the spring force required to prevent translational movement of the second member 28 as the valve is initially opened), further rotational movement of the shaft 20 is converted to translational movement of the second member 28 relative to the first 26, and the hole 34 is then increasingly uncovered as illustrated in FIG. 3, thus reducing the effective area of the leading wing of the valve plate 12. The reduction in area continues in response to rotation of the shaft 20 until the torque exerted by the fluid drops sufficiently to be overcome by the spring force, at which time continued rotational movement of the valve plate ensues. This process continues until limited by the area of the hole 34, by abutment of the second member 28 with the spaced bodies 44,46, by some means for avoiding projection of the second member in a radially outward direction from the first member 26, or by the maximum opening angle of the valve plate 12. It should be recognized that the precise limitation will vary among different embodiments of the invention, and may also be dictated by application-driven factors.

Figure 4:
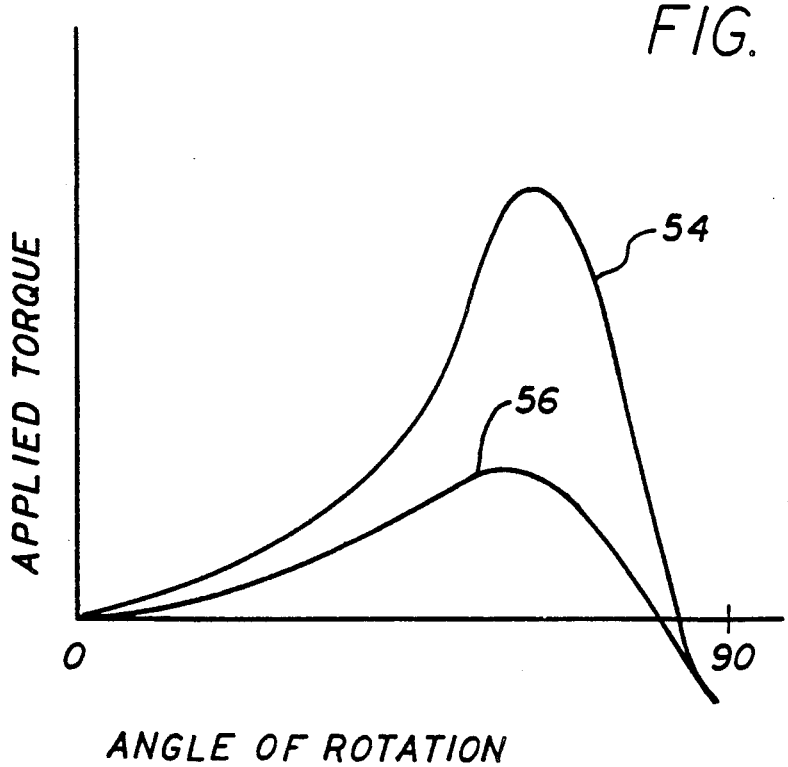
FIG. 4 is a graph illustrating applied torque as a function of the rotational position of the valve plate for a conventional butterfly valve, and for the valve of the present invention.

The graphical representation of FIG. 4 is provided to illustrate the above-described effects on torque. Curve 54 is a typical torque curve for a butterfly valve in an application characterized by high pressure ratios. Curve 56 is the hypothesized general form of the torque curve resulting from use of the invention, and can be expected to vary with both application and design.

The foregoing portion of the description, which description includes the accompanying drawings, is not intended to restrict the scope of the invention to the preferred embodiment thereof, or to specific details which are ancillary to the teaching contained herein. The scope of the invention should be determined by reference to the following claims, as reasonably interpreted in view of the remainder of the description.

What is claimed is:

1. A butterfly valve comprising in combination:
   a mounting body forming a flow path extending therethrough;
   a shaft defining a longitudinal axis thereof that extends across the flow path, the shaft being supported by the mounting body for rotational movement about the axis,
   a valve plate disposed in the flow path and oriented substantially parallel to the axis, the valve plate being supported by the shaft for rotational movement from a first rotational position maximally restricting flow along the path to a second rotational position maximally permitting flow, the valve plate comprising a first plate-like member having a hole formed therethrough and a second plate-like member secured to the first so as to permit translational movement of the second member in directions substantially parallel to the first member, the second member being variably movable from a first translational position at which the second member spans the hole to maximally restrict flow therethrough to a second translational position at which the second member maximally permits flow through the hole;
   converting means secured to the shaft and the second member for effecting the translational movement in response to relative rotational movement between the shaft and the valve plate; and
   biasing means, secured to the valve plate so as to be carried therewith during rotational movement thereof, for resisting the translational movement and urging the second member toward the position at which it spans the hole,
   whereby the converting means and biasing means are cooperative when the second member is between the first and second translational positions to alternatively effect the translational movement of the second member or the rotational movement of the valve plate in response to rotation of the shaft.

* * * * *